(12) United States Patent
Sklenar et al.

(10) Patent No.: US 11,447,169 B2
(45) Date of Patent: Sep. 20, 2022

(54) ATTACHMENT FOR PUSH APPARATUS

(71) Applicant: Fred Sklenar, Saint Paul, MN (US)

(72) Inventors: Fred Sklenar, Saint Paul, MN (US); Rachel Anna Hendricks, Brielle, NJ (US)

(73) Assignee: Fred Sklenar, Saint Paul, MN (US)

( * ) Notice: Subject to any disclaimer, the term of this patent is extended or adjusted under 35 U.S.C. 154(b) by 0 days.

(21) Appl. No.: 17/469,344

(22) Filed: Sep. 8, 2021

(65) Prior Publication Data

US 2022/0073121 A1 Mar. 10, 2022

Related U.S. Application Data

(60) Provisional application No. 63/075,363, filed on Sep. 8, 2020.

(51) Int. Cl.
  *B62B 9/20* (2006.01)
(52) U.S. Cl.
  CPC ............ *B62B 9/20* (2013.01); *B62B 2501/00* (2013.01)
(58) Field of Classification Search
  CPC .......... B62B 9/20; B62B 9/12; B62B 2501/00
  See application file for complete search history.

(56) References Cited

U.S. PATENT DOCUMENTS

| | | |
|---|---|---|
| 4,953,880 A | 9/1990 | Sudakoff et al. |
| 5,375,861 A | 12/1994 | Gifford |
| 5,536,027 A | 7/1996 | Gollub |
| 5,562,300 A | 10/1996 | Nelson |
| 5,674,165 A | 10/1997 | Cohen et al. |

(Continued)

FOREIGN PATENT DOCUMENTS

| | | |
|---|---|---|
| DE | 202014006366 U1 | 8/2014 |
| DE | 102014011681 A1 | 2/2016 |

(Continued)

OTHER PUBLICATIONS

Baby Jogger, Glider Board, https://www.babyjogger.com/accessories/glider-board-for-city-mini-2-city-mini-2-double-city-mini-gt2-city-mini-gt2-double-city-select-city-select-2-and-city-select-lux-strollers/SAP_2084012.html, accessed Sep. 21, 2021.

(Continued)

*Primary Examiner* — John D Walters
(74) *Attorney, Agent, or Firm* — Grumbles Law PLLC; Brittany Nanzig

(57) ABSTRACT

A push apparatus attachment can include a frame connecter for connecting at two points to a push apparatus frame; a height-adjustment frame pivotally connected to the frame connector; and a pivot assembly structured and configured to be gripped by a user's hands. The pivot assembly can include a swing bar pivotally connected to the height-adjustment frame and a grip bridge having at least two hand grips, one on each end of the grip bridge, the grip bridge being pivotally connected to the swing bar. The various pivot connections enable the device to accommodate users of different heights, enable the pivot assembly to remain parallel to the ground when the height-adjustment frame rotates relative to the frame connector, and enable free movement of the outer ends of the grip bridge in three dimensions to allow for a user to maintain natural running form while pushing the push apparatus.

20 Claims, 15 Drawing Sheets

(56) References Cited

U.S. PATENT DOCUMENTS

| | | | |
|---|---|---|---|
| 5,876,309 A * | 3/1999 | Archey | A63B 21/4047 |
| | | | 482/14 |
| 6,098,993 A | 8/2000 | Beilinson | |
| 6,196,947 B1 | 3/2001 | Anderson | |
| 6,722,689 B2 | 4/2004 | Kreamer | |
| 7,309,071 B1 | 12/2007 | Michael | |
| 7,311,313 B1 | 12/2007 | Ray et al. | |
| 7,803,098 B2 | 9/2010 | Cofrin | |
| 7,938,409 B2 | 5/2011 | Mejia | |
| 8,091,899 B2 | 1/2012 | Mejia | |
| 8,172,243 B2 | 5/2012 | Dresher | |
| 8,695,992 B2 | 4/2014 | Piaget et al. | |
| 9,144,708 B2 * | 9/2015 | Selek | A63B 23/16 |
| 9,365,229 B2 | 6/2016 | Ortega | |
| 9,434,401 B2 | 9/2016 | Johnson | |
| 9,840,266 B2 | 12/2017 | Caradec et al. | |
| 10,077,063 B2 | 9/2018 | Haut et al. | |
| 11,097,762 B1 * | 8/2021 | Collins | B62B 5/064 |
| 2008/0143067 A1 | 6/2008 | Wicka | |
| 2008/0296326 A1 | 12/2008 | Berlin et al. | |
| 2008/0296851 A1 | 12/2008 | Hall | |
| 2009/0261540 A1 | 10/2009 | Mejia | |
| 2011/0210524 A1 | 9/2011 | Mejia | |
| 2012/0025494 A1 | 2/2012 | Griffith | |
| 2012/0038124 A1 | 2/2012 | Newton, Jr. | |
| 2013/0069327 A1 | 3/2013 | Tran | |
| 2014/0008883 A1 | 1/2014 | Litman et al. | |
| 2014/0265167 A1 | 9/2014 | Mejia | |
| 2015/0069738 A1 * | 3/2015 | Knight | A63B 21/4035 |
| | | | 280/47.38 |
| 2016/0101800 A1 | 4/2016 | Caradec et al. | |
| 2018/0178824 A1 | 6/2018 | Hanson et al. | |
| 2020/0262463 A1 * | 8/2020 | Villarreal | A63B 21/4033 |

FOREIGN PATENT DOCUMENTS

| | | |
|---|---|---|
| WO | 2018101823 A1 | 6/2018 |
| WO | 2018148826 A1 | 8/2018 |
| WO | 2019067949 A1 | 4/2019 |

OTHER PUBLICATIONS

Englacha USA, Englacha Cozy Stroll Handle Extension Bar, via Amazon, https://www.amazon.com/Englacha-Stroll-Handle-Extension-Black/dp/B00OOKC13G, accessed Sep. 21, 2021.

Fabrication Enterprises, Love Handles Portable Upper Body Exerciser, Shoulder and Arm Skates, https://www.rehab-store.com/p-love-handles-portable-upper-body-exerciser.html?gclid=CjwKCAjwhaaKBhBcEiwA8acsHA-gsvzsSgbweabEG4ebksVowL3yfmJSm%E2%80%A6, accessed Sep. 21, 2021.

JogAlong Running Stroller, https://jogalong.com/ergonomic-design/, accessed Sep. 21, 2021.

KidRunner RUN 2.0, Hands Free Jogging Stroller and Running Trailer, https://kidrunners.com/products/jogging-stroller, accessed Sep. 21, 2021.

Stroll-Smart, Stroll-Smart Hands Free Jogging Stroller Adaptor, https://www.healthchecksystems.com/stroll_smart_jogging_stroller_adaptor.htm, accessed Sep. 21, 2021.

* cited by examiner

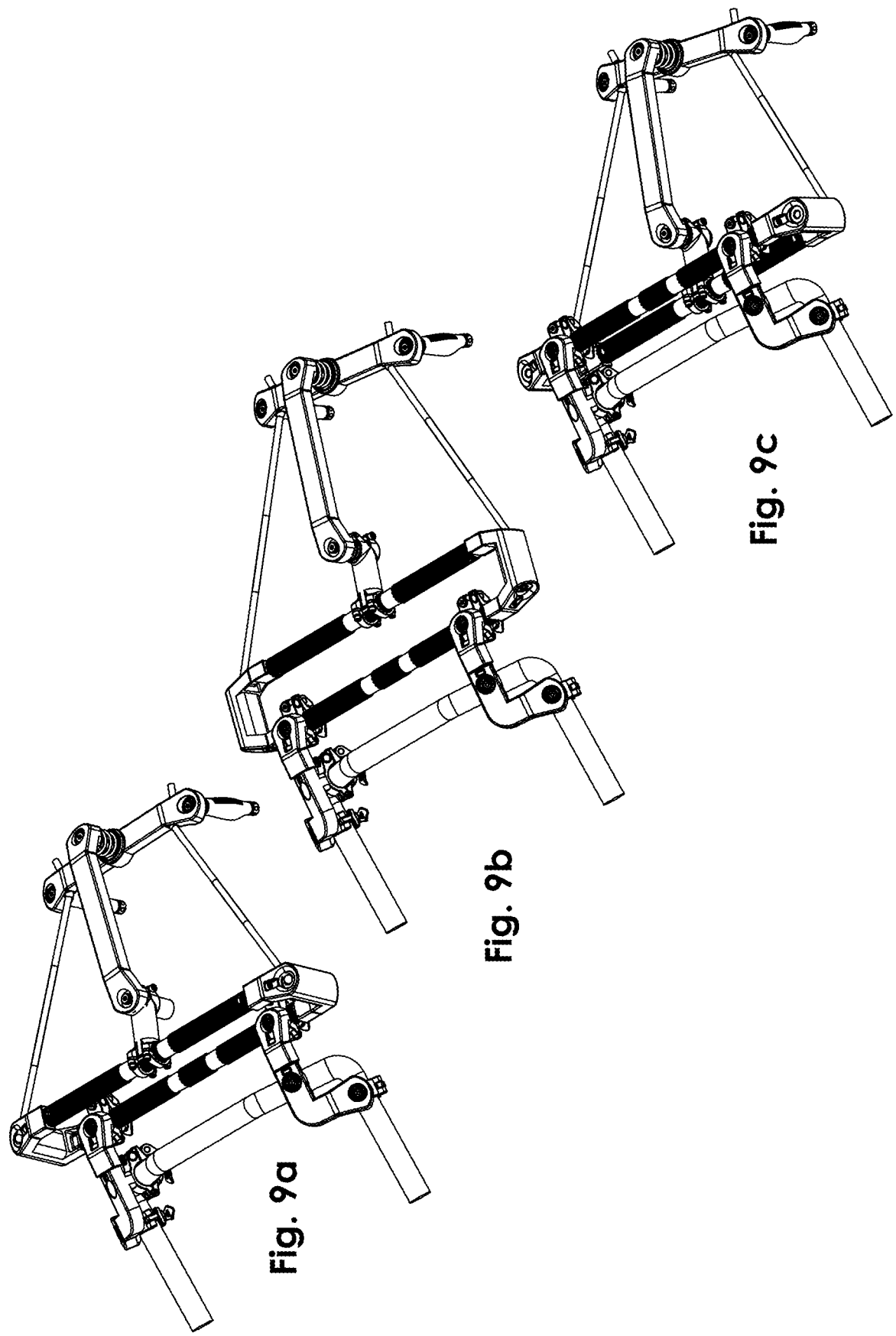

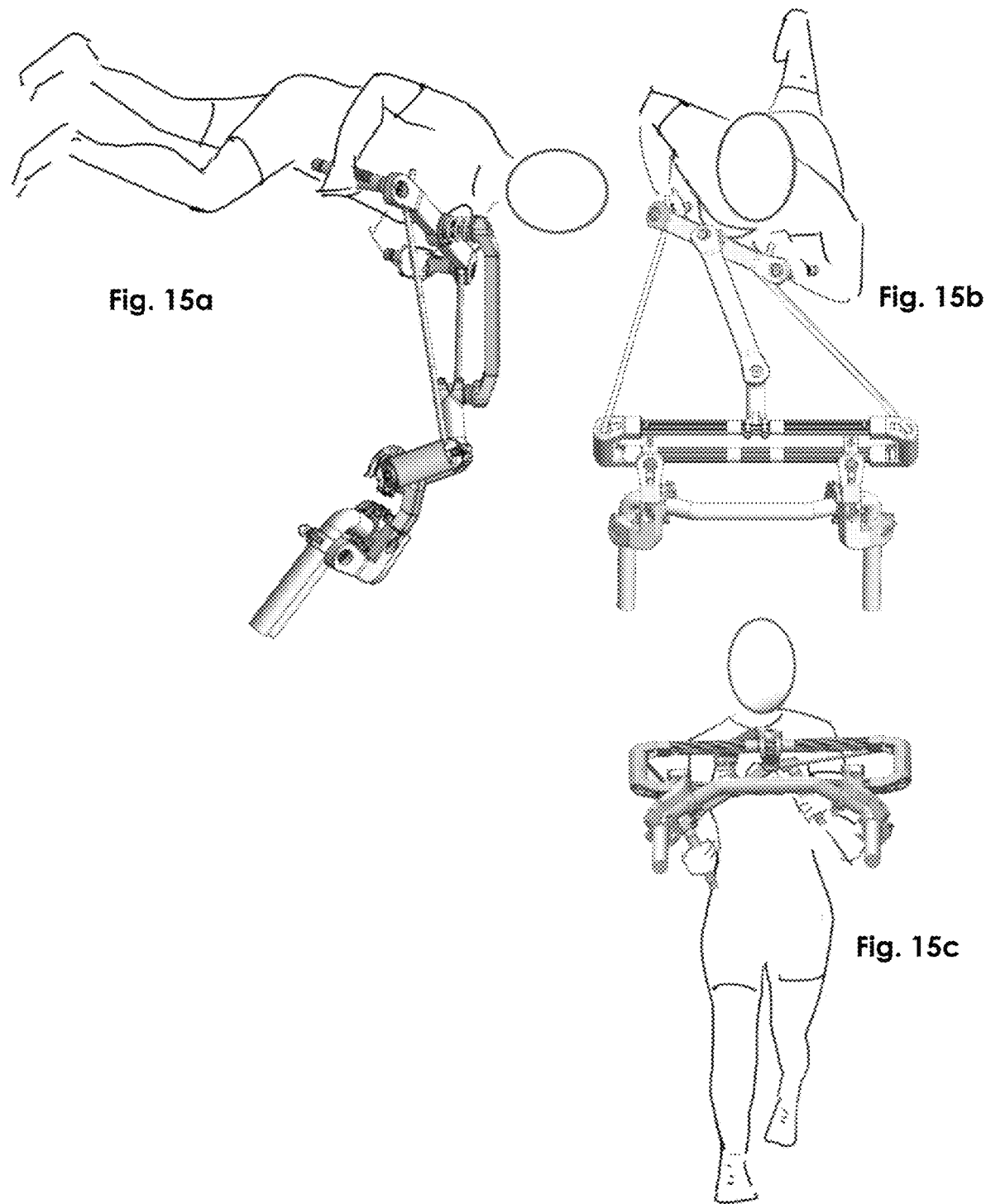

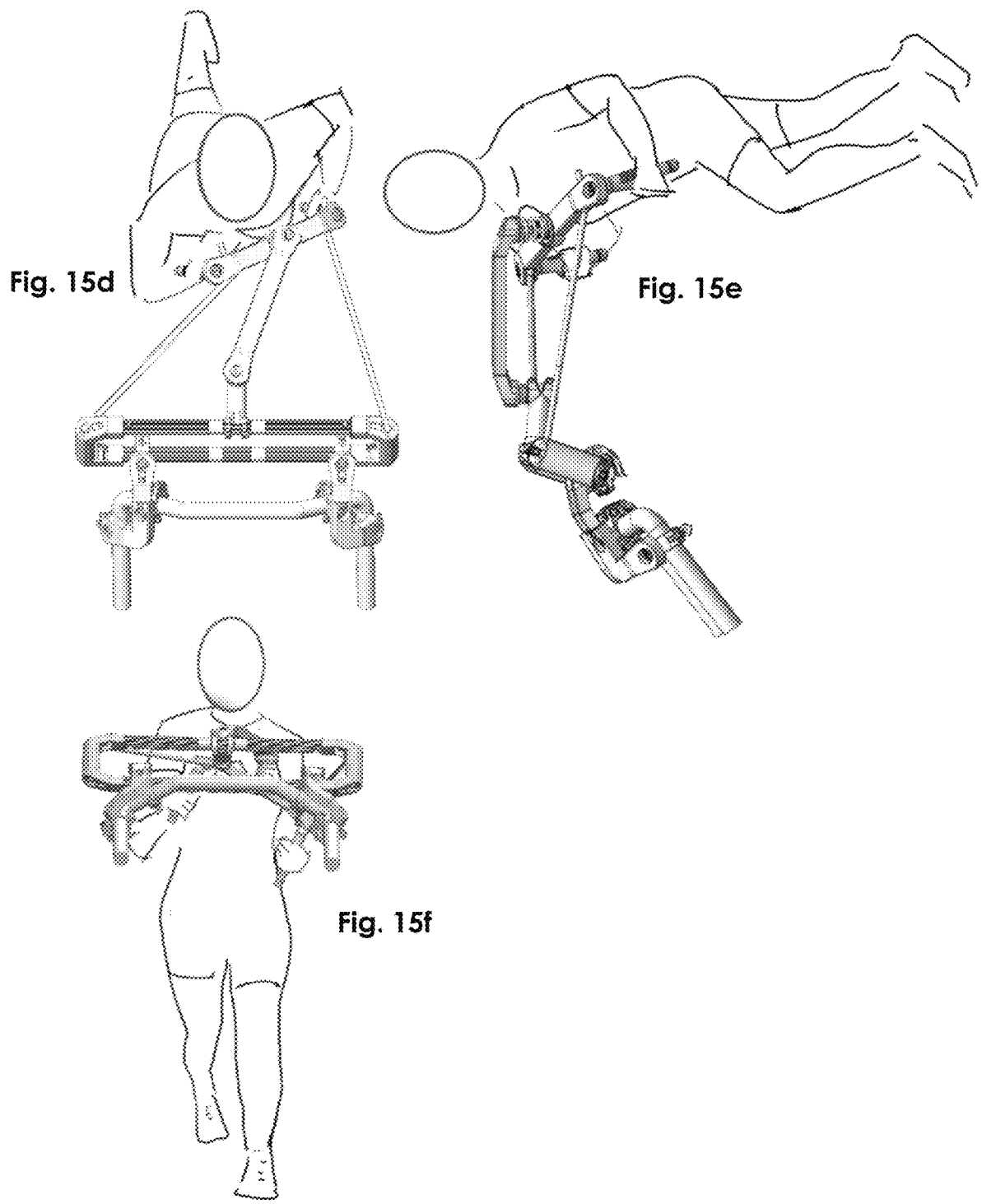

United States Patent US 11,447,169 B2

ATTACHMENT FOR PUSH APPARATUS

CROSS REFERENCE TO RELATED APPLICATION

This application claims priority to U.S. Provisional Patent Application No. 63/075,363, filed on Sep. 8, 2020, the entire disclosure of which is hereby incorporated by reference

FIELD OF THE INVENTION

This disclosure relates to attachments for push apparatuses, and more particularly, relates to attachments for push apparatuses to assist with allowing ideal running form.

BACKGROUND OF THE INVENTION

Exercise has been consistently touted as an effective way to combat health and aging concerns. However, demands on adults in current society, especially adults with young children, often leave them without time for independent exercise. Further, for adults with children that do have time, the type of exercise available is limited to activity that can be done with children in tow. One example of a such an activity is running, jogging, or walking with a jogging stroller. While jogging strollers have been designed with runners in mind, they often do not accommodate proper running form, are prohibitively expensive, and do not double as a day-to-day stroller, thereby requiring the purchase of a second stroller. A device is needed that can universally convert a stroller, or other push apparatus, into a jogging stroller while allowing for proper running form.

SUMMARY

This disclosure relates to attachments for push apparatuses, and more particularly, relates to attachments for push apparatuses to assist with allowing ideal running form. In one aspect, the disclosure provides a push apparatus attachment device that can include a frame connecter for connecting to a push apparatus frame; a height-adjustment frame connected to the frame connector; and a pivot assembly structured and configured to be gripped by a user's hands, the pivot assembly including: a swing bar connected to the height-adjustment frame, and a grip bridge having at least two hand grips, the grip bridge being connected to the swing bar.

In some cases, a distal end of the swing bar can connect to the height-adjustment frame via a pivot connect. Further, the pivot connect may enable free movement of a proximal end of the swing bar along a horizontal arced path relative to a user during use, wherein the horizontal arced path can be in a single plane arching between left and right endpoints.

In some cases, a central portion of the grip bridge can connect to the swing bar using a pivot connect. Further, the pivot connect may enable free movement of outer ends of the grip bridge in three dimensions relative to a user during use.

The grip bridge may further include a hand grip aperture on opposite ends of the grip bridge. Each hand grip can be positioned in one of the hand grip apertures and can be configured to freely rotate 360 degrees within the hand grip aperture.

In some cases, the frame connector can include a frame connector body and at least two connection points for connection to the push apparatus frame at a plurality of locations; and the at least two connection points can include a first connection joint near a distal end of the frame connector, and a second connection joint near a proximal end of the frame connector. In some embodiments, the frame connector may further include a third connection point on the proximal end of the frame connector; and a break in the frame connector between the second connection joint and the third connection point.

Further, the device can include a second frame connector having at least two connection points for connection to the push apparatus frame at a plurality of locations, wherein the at least two connection points of the second frame connector can include a first connection joint near a distal end of the second frame connector, and a second connection joint near a proximal end of the second frame connector.

In some cases, the height-adjustment frame can be rotatably connected to the frame connector such that the height of the pivot assembly is adjustable to accommodate users of different heights. The pivot assembly may be rotatably connected to the height-adjustment frame such that at least the swing bar remains parallel to the ground when the height-adjustment frame rotates relative to the frame connector. The device may further comprise a first tension band attaching on one end to the height-adjustment frame and on an opposite end to a first outer end of the grip bridge; and a second tension band attaching on one end to the height-adjustment frame and on an opposite end to a second outer end of the grip bridge that is opposite the first outer end.

In some embodiments of the device, the height-adjustment frame can include a height-adjustment frame body, a first ratchet bar section on a distal portion of the height-adjustment frame body, and a second ratchet bar section on a proximal portion of the height-adjustment frame body. Additionally, the frame connector can include a ratchet tooth clamp on a proximal end of the frame connector body for connection to the first ratchet bar section; and the pivot assembly can include a ratchet tooth clamp on a distal end of the pivot assembly for connection to the second ratchet bar section.

In another aspect, the disclosure provides a push apparatus attachment device that can include at least two frame connecters for connecting to a push apparatus frame, each frame connector connecting at two points along the push apparatus frame; a height-adjustment frame pivotally connected to the at least two frame connectors; and a pivot assembly structured and configured to be gripped by a user's hands. The pivot assembly can include a swing bar pivotally connected to the height-adjustment frame, and a grip bridge having at least two hand grips, one on opposite ends of the grip bridge, the grip bridge being connected to the swing bar.

In some embodiments, the pivot connection between the height-adjustment frame and the frame connectors can enable the pivot assembly to adjust in height to accommodate users of different heights, and the pivot connection between the swing bar and the height-adjustment frame can enable the pivot assembly to remain parallel to the ground when the height-adjustment frame rotates relative to the frame connectors.

Further, in some embodiments of the device a distal end of the swing bar can connect to the height-adjustment frame using a pivot connect, and the pivot connect can enable free movement of a proximal end of the swing bar along a horizontal arced path relative to a user during use, wherein the horizontal arced path is in a single plane arching between left and right endpoints.

In some cases, a central portion of the grip bridge can connect to the swing bar using a pivot connect, and the pivot connect can enable free movement of outer ends of the grip bridge in three dimensions relative to a user during use.

In other cases, the grip bridge can include a hand grip aperture on opposite ends of the grip bridge, and each hand grip can be positioned in one of the hand grip apertures and can be configured to freely rotate 360 degrees within the hand grip aperture.

In another aspect, the disclosure provides a method of using a push apparatus attachment device that can include the steps of attaching at least two frame connecters to a push apparatus frame, each frame connector connecting at at least two points along the push apparatus frame; rotating a height-adjustment frame that is pivotally connected to the frame connectors to accommodate a user's height; rotating a swing bar of a pivot assembly that is pivotally connected to the height-adjustment frame to keep the pivot assembly parallel to the ground; gripping each of two hand grips with the user's hand, wherein the hand grips are located on each of two outer ends of a grip bridge of the pivot assembly, the grip bridge being pivotally connected to the swing bar; and pushing the push apparatus frame forward.

In some embodiments, a proximal end of the swing bar can move along a horizontal arced path relative to a user during use, the swing bar horizontal arced path being in a single plane arching between left and right endpoints. Further, each of the two outer ends of the grip bridge may move in three dimensions relative to a user during use, each of the two hand grips can be positioned in hand grip apertures at the outer ends of the grip bridge, and each of the two hand grips can be configured to freely rotate 360 degrees within the hand grip aperture.

The above summary is not intended to describe each and every example or every implementation of the disclosure. The description that follows more particularly exemplifies various illustrative embodiments.

BRIEF DESCRIPTION OF THE DRAWINGS

The following description should be read with reference to the drawings. The drawings, which are not necessarily to scale, depict examples and are not intended to limit the scope of the disclosure. The disclosure may be more completely understood in consideration of the following description with respect to various examples in connection with the accompanying drawings, in which:

FIGS. 9a-9c illustrate top perspective views of the various height adjustment configurations for the pivot assembly;

FIGS. 15a-15f illustrate the natural running movement permitted by the attachment for a push apparatus of the present disclosure.

DETAILED DESCRIPTION

Figure 1:
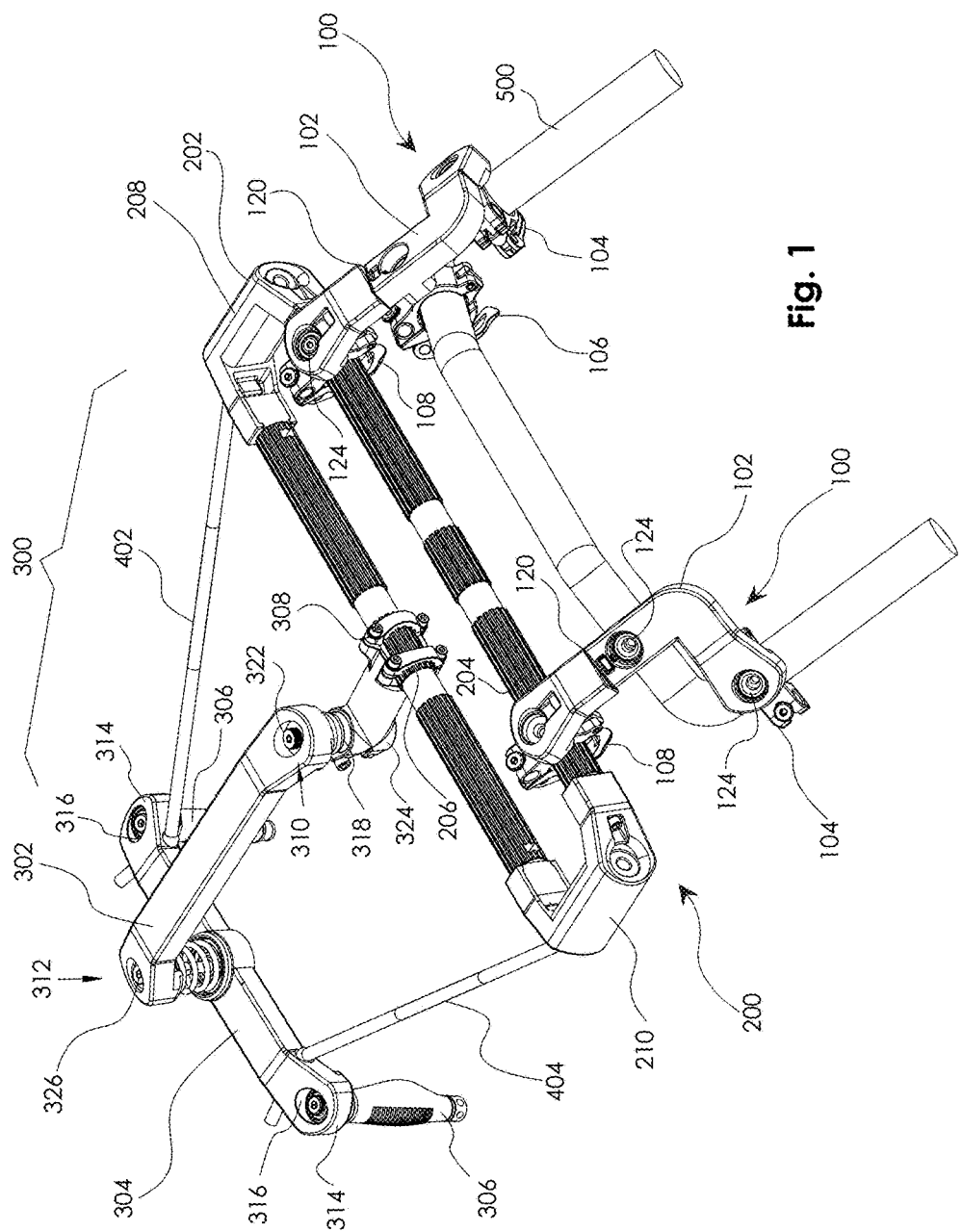
FIG. 1 is a top perspective view of an illustrative example of an attachment for a push apparatus of the present disclosure.

The present disclosure relates to attachments for push apparatuses, and more particularly, relates to attachments for push apparatuses to assist with allowing ideal running form. Various embodiments are described in detail with reference to the drawings, in which like reference numerals may be used to represent like parts and assemblies throughout the several views. Reference to various embodiments does not limit the scope of the systems and methods disclosed herein. Examples of construction, dimensions, and materials may be illustrated for the various elements, and those skilled in the art will recognize that many of the examples provided have suitable alternatives that may be utilized. Any examples set forth in this specification are not intended to be limiting and merely set forth some of the many possible embodiments for the systems and methods. It is understood that various omissions and substitutions of equivalents are contemplated as circumstances may suggest or render expedient, but these are intended to cover applications or embodiments without departing from the spirit or scope of the disclosure. Also, it is to be understood that the phraseology and terminology used herein are for the purpose of description and should not be regarded as limiting.

In the following description, as is traditional, the term "proximal" refers to the portion of the device, assembly, or components closest to the user, while the term "distal" refers to those remote from the user.

While this disclosure speaks to ideal running form, it does not intend to define what is ideal running form. However, it is well known, documented and understood that the human body's motion, specific to the four limbs (two arms; two legs) and the torso with which they are attached, has a transverse and opposite stride in symmetry. More specifically, through the human torso, arms and legs pivot in an intricate and complex manner so that when the right leg is in a forward distal stride, the left leg is in a rearward proximal position, and the torso is twisted oppositely at the shoulders, in relation to the hips. This typically results in the left arm being forwardly thrusted in stride resulting in the increase in height position of the left hand both forward distally and rightward medially across the torso, and the right hand results in a rearward stride thrusted downward and proximally also across the torso.

Conversely, as the motion of moving the body forward causes the opposing left leg to move forward in a distal stride, the right leg is in a rearward proximal position, and the torso is twisted opposite from the above-described position in the shoulder relationship to the hips. This results in the right arm being forward distally thrusted in stride resulting in the increase in height position of the right hand both forward distally and leftward medially across the torso, and the left hand results in a rearward stride thrusted downward proximally also across the torso in a lateral direction. This motion is illustrated in FIGS. 15a-15f.

FIG. 1 is a top perspective view of an illustrative example of an attachment device for a push apparatus of the present disclosure. The attachment device can include frame connector 100, height-adjustment frame 200, and pivot assembly 300. Frame connector 100 can include frame connector body 102 and three connection points: first connection joint 104, second connection joint 106, and ratchet tooth clamp 108. Height-adjustment frame 200 can include height-adjustment frame body 202, first ratchet bar section 204, second ratchet bar section 206, lateral height adjustment frame 208, and medial height-adjustment frame 210. Pivot assembly 300 can include swing bar 302, grip bridge 304, and hand grip 306. Swing bar 302 can further include ratchet tooth clamp 308 and pivot connect 310. Grip bridge 304 can further include pivot connect 312, outer ends 314, and hand grip apertures 316 for connection to hand grips 306.

Figure 2:
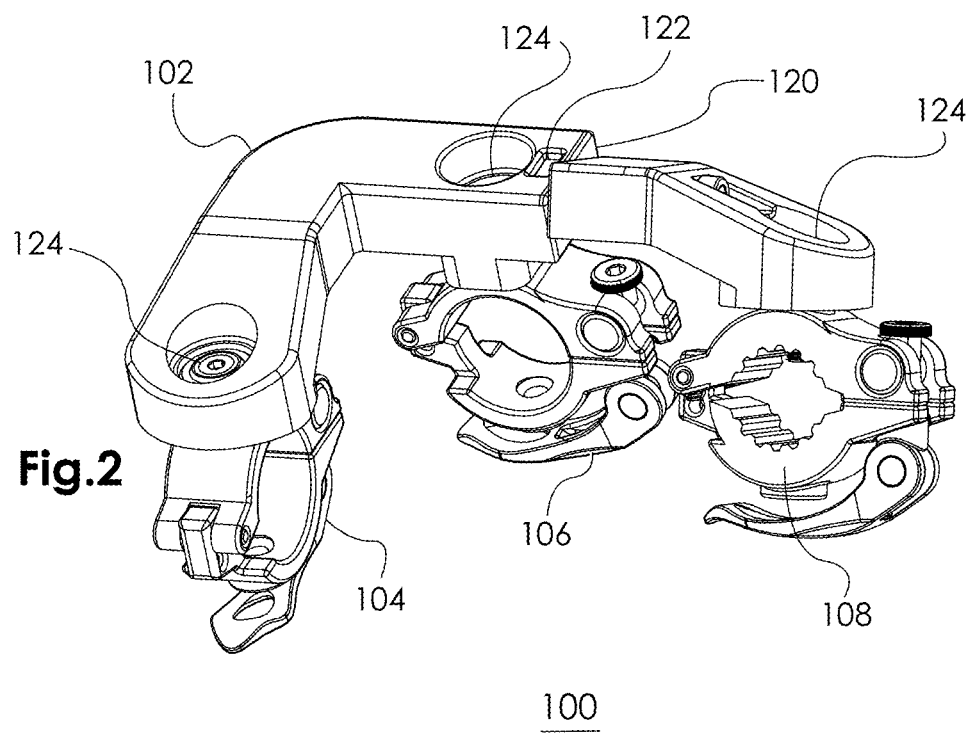
FIG. 2 is a schematic view of a frame connector.
Figure 3:
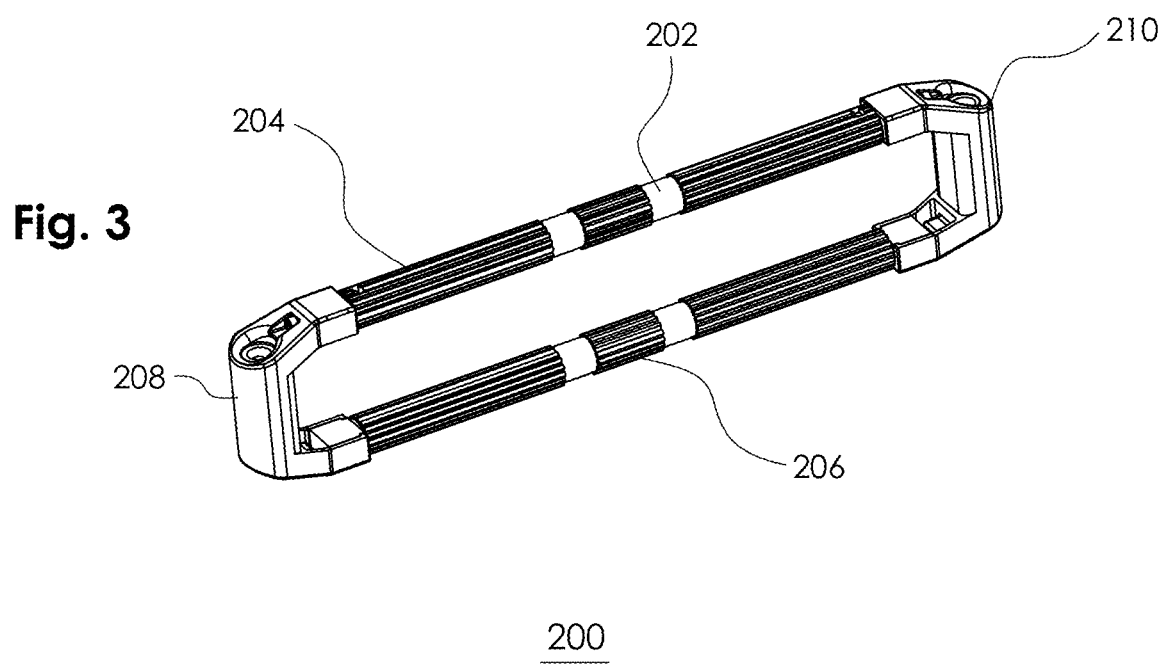
FIG. 3 is a schematic view of the height-adjustment frame.
Figure 4:
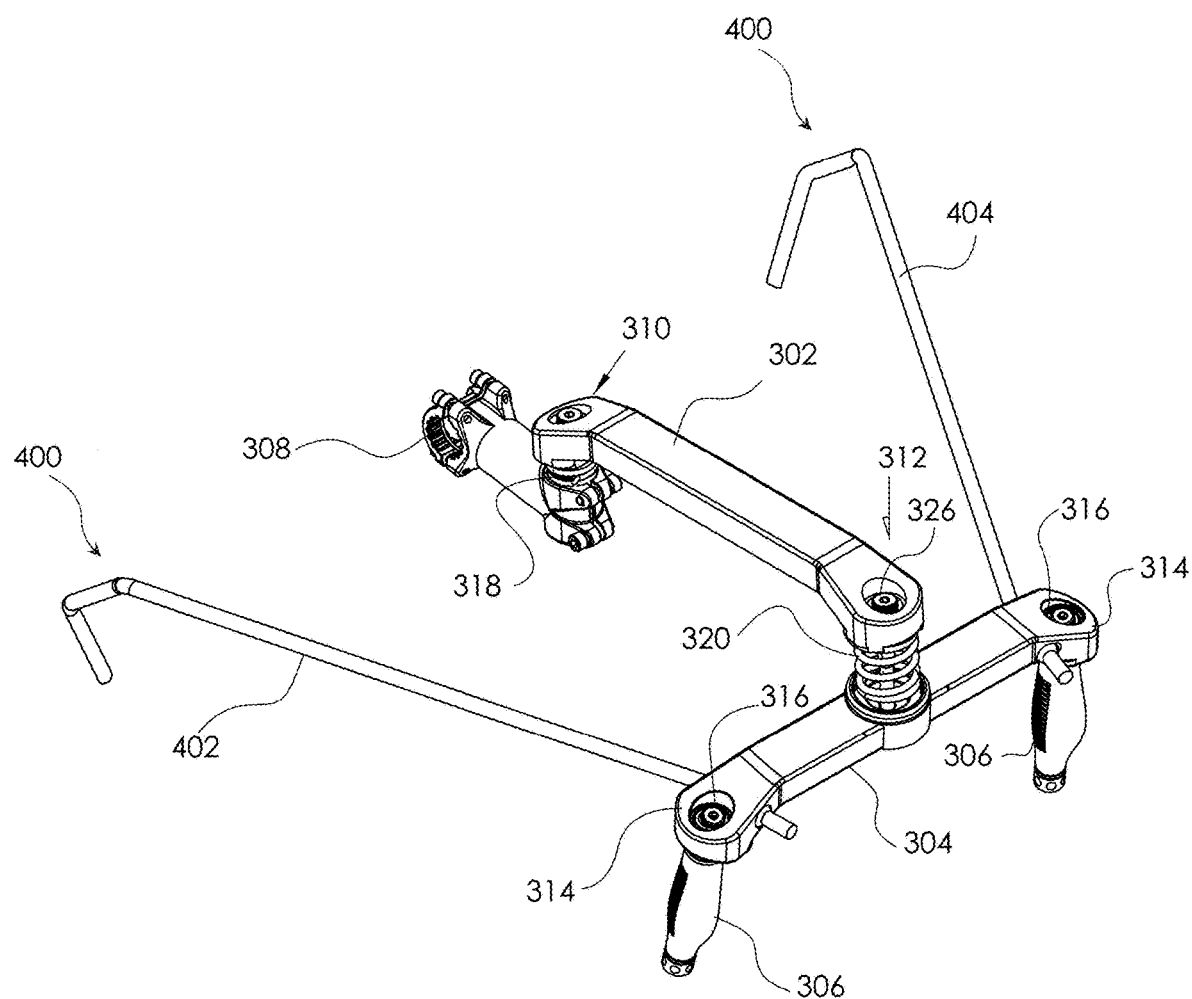
FIG. 4 is a schematic view of the pivot assembly.
Figure 5:
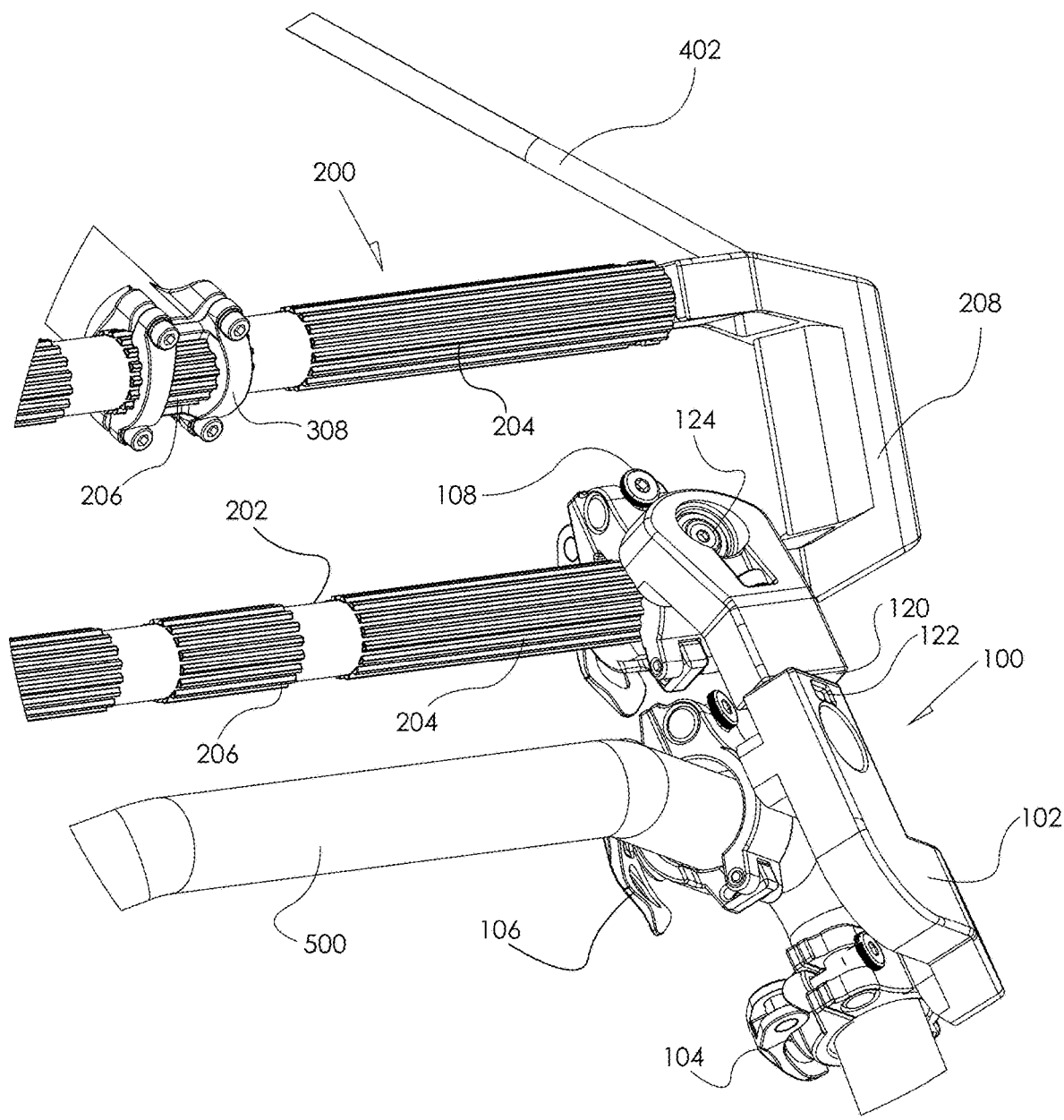
FIG. 5 is a schematic view of the first and second connection joints attached to the push apparatus frame, the ratchet tooth clamp of the frame connector attached to the first ratchet bar section, and the ratchet tooth clamp of the pivot assembly attached to the second ratchet bar section.
Figure 6:
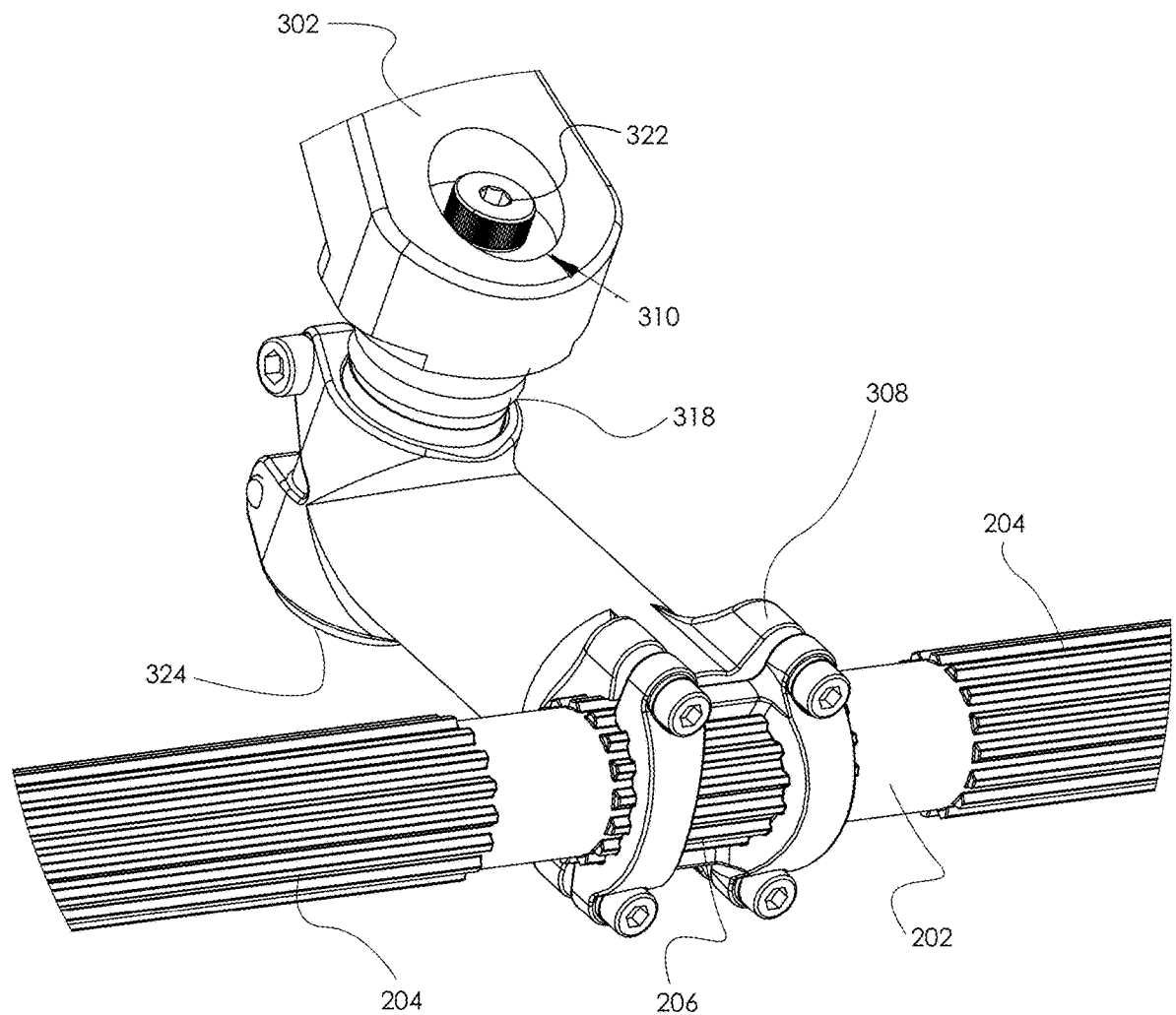
FIG. 6 is a schematic view of the ratchet tooth clamp of the pivot assembly attached to the second ratchet bar section.
Figure 7:
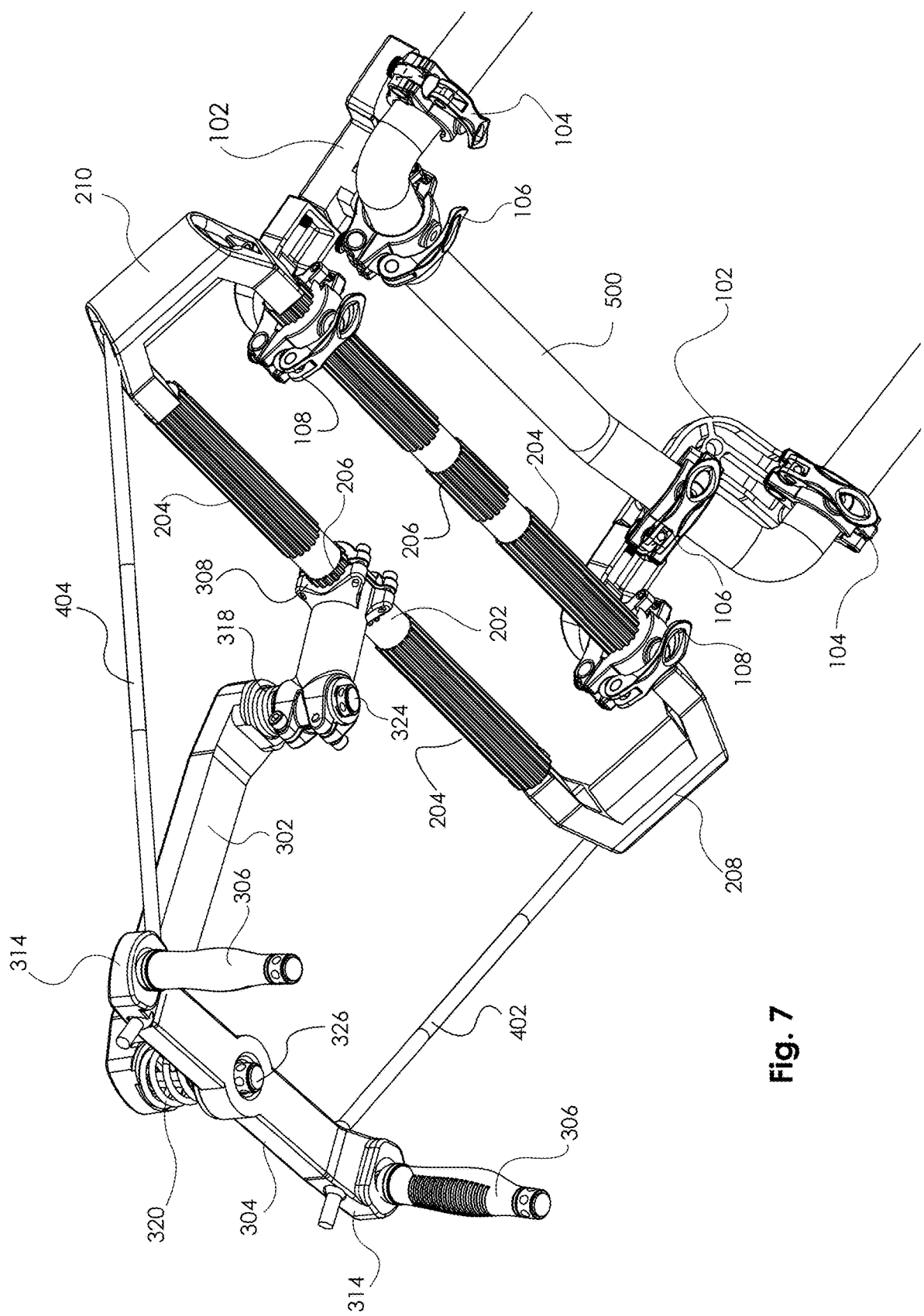
FIG. 7 is a bottom perspective view of the attachment for a push apparatus.
Figure 8:
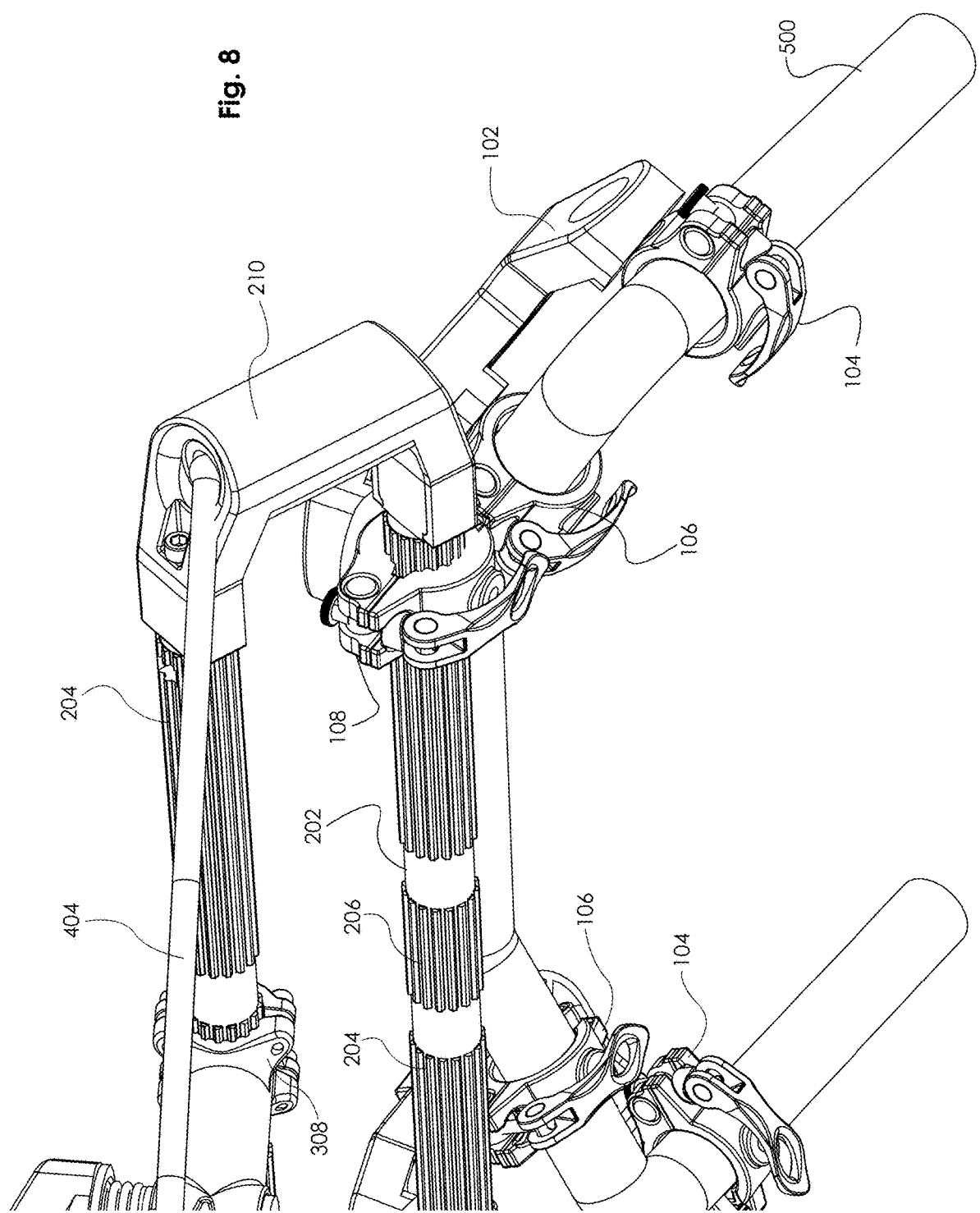
FIG. 8 is a schematic view of the first and second connection joints attached to the push apparatus frame and the ratchet tooth clamp of the frame connector attached to the first ratchet bar section.
Figure 10A:
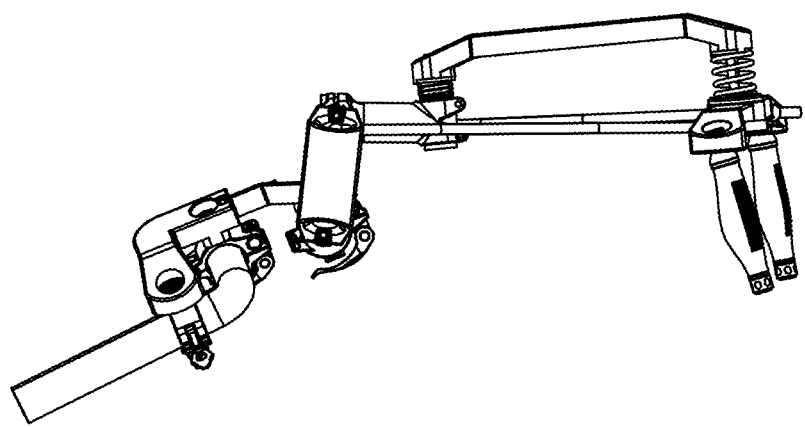
FIGS. 10a-10c illustrate side views of the various height adjustment configurations for the pivot assembly.
Figure 10B:
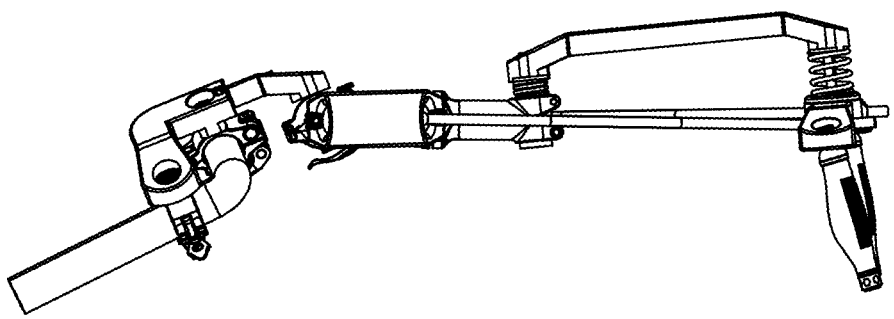
Figure 10C:
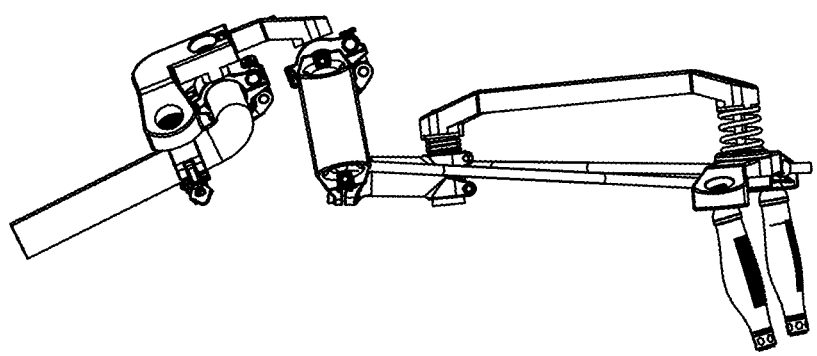
Figure 11A:
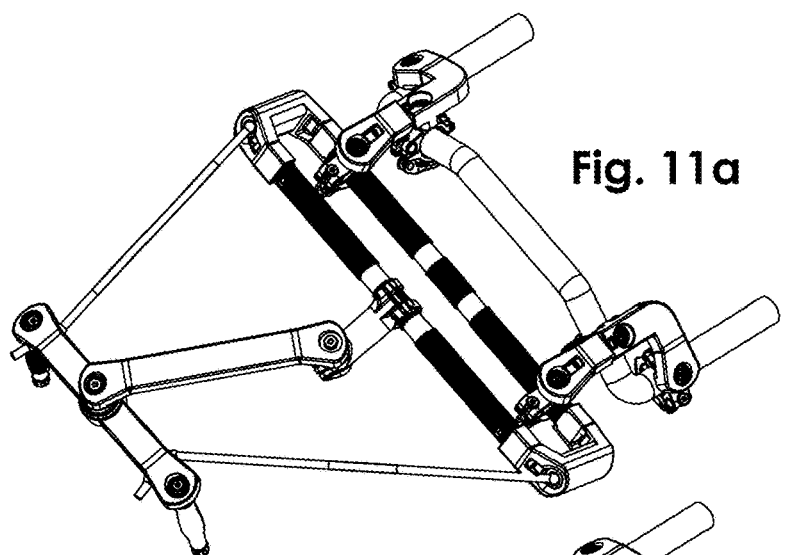
FIGS. 11a-11c illustrate top perspective views of the pivot assembly swinging from one side to another side.
Figure 11B:
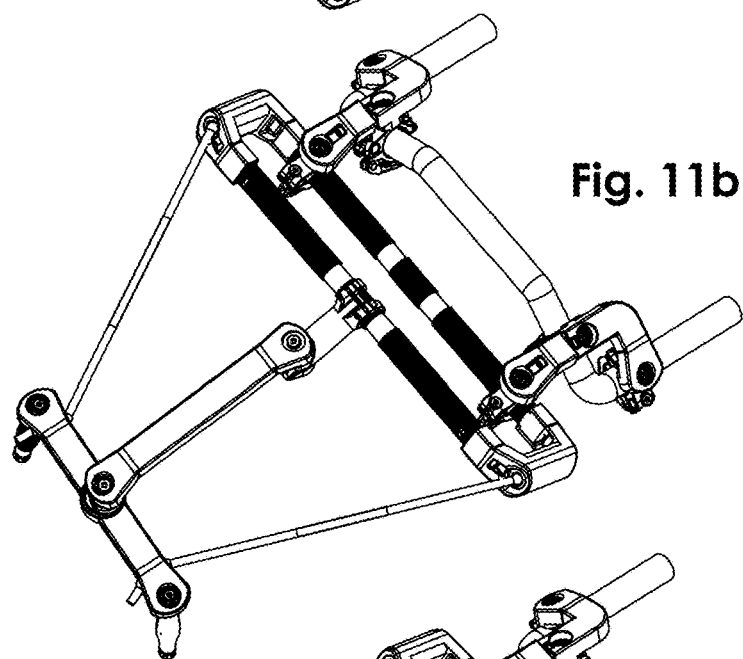
Figure 11C:
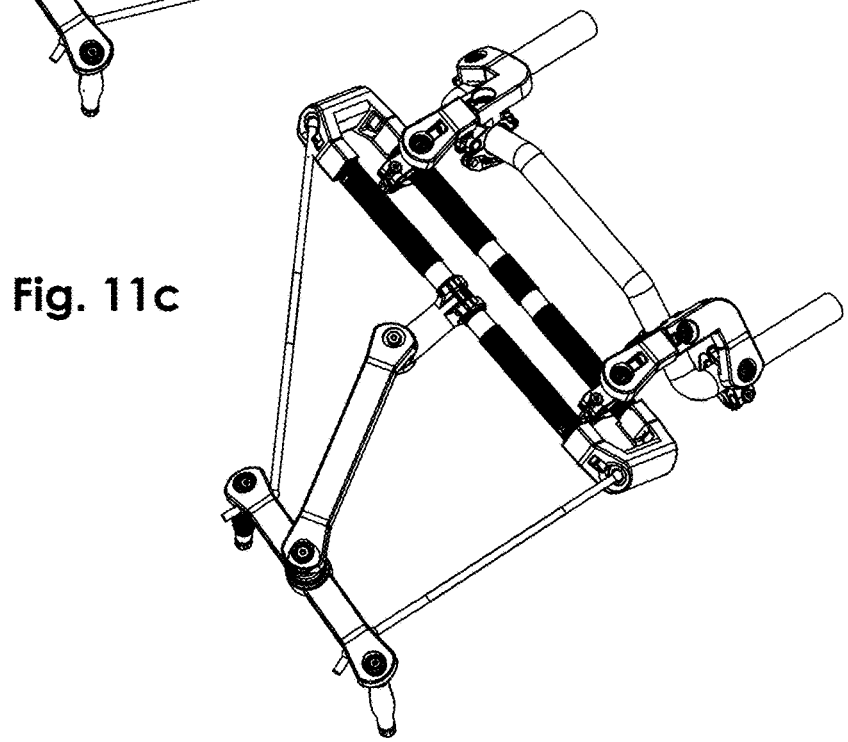
Figure 12A:
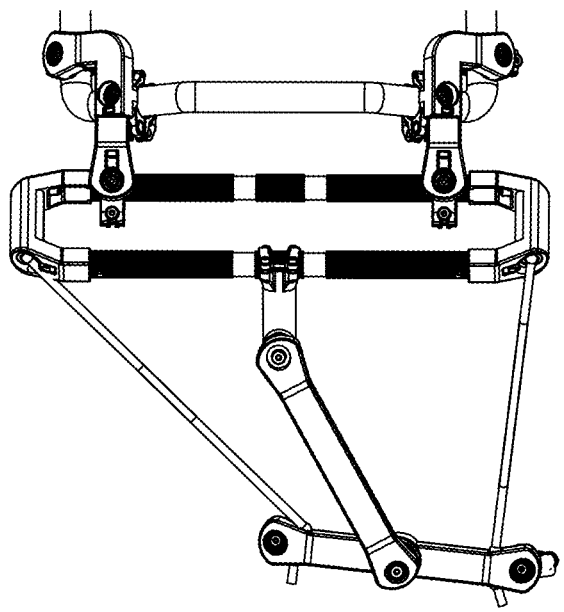
FIGS. 12a-12c illustrate top views of the pivot assembly swinging from one side to another side.
Figure 12B:
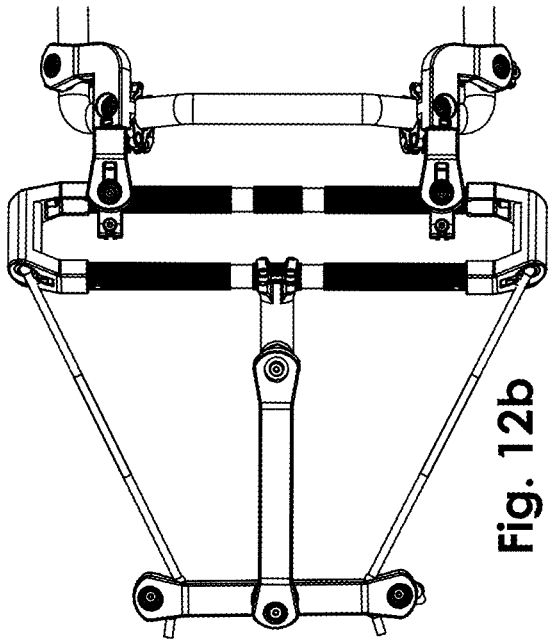
Figure 12C:
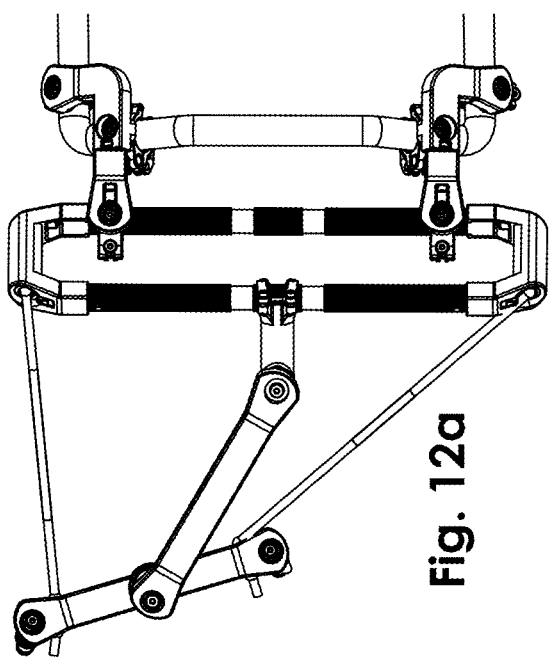
Figure 13A:
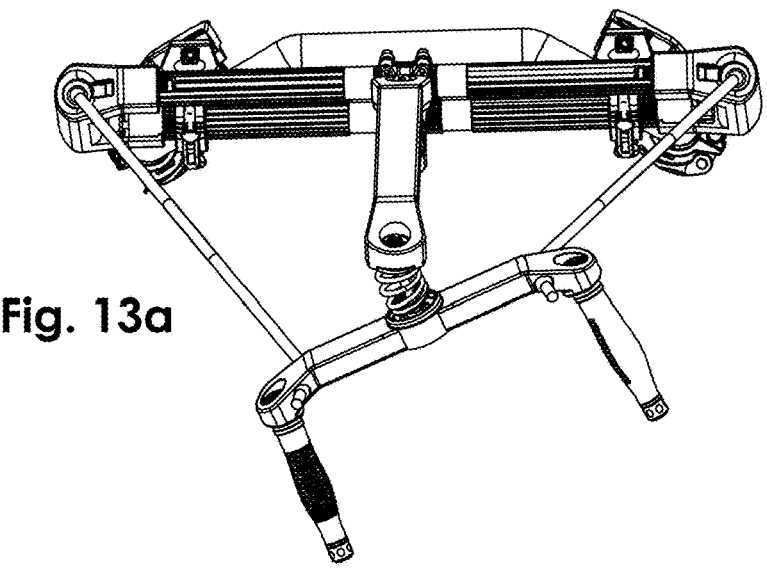
FIGS. 13a-13c illustrate front views of the grip bridge of the pivot assembly with the outer ends shifting up and down.
Figure 13B:
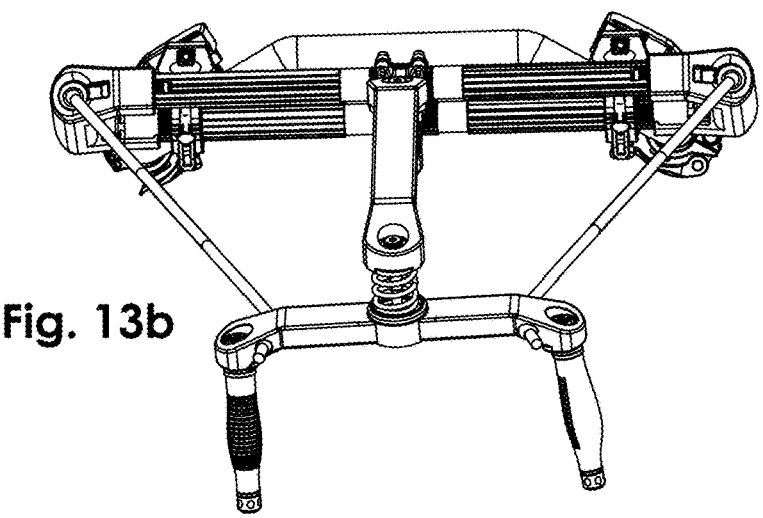
Figure 13C:
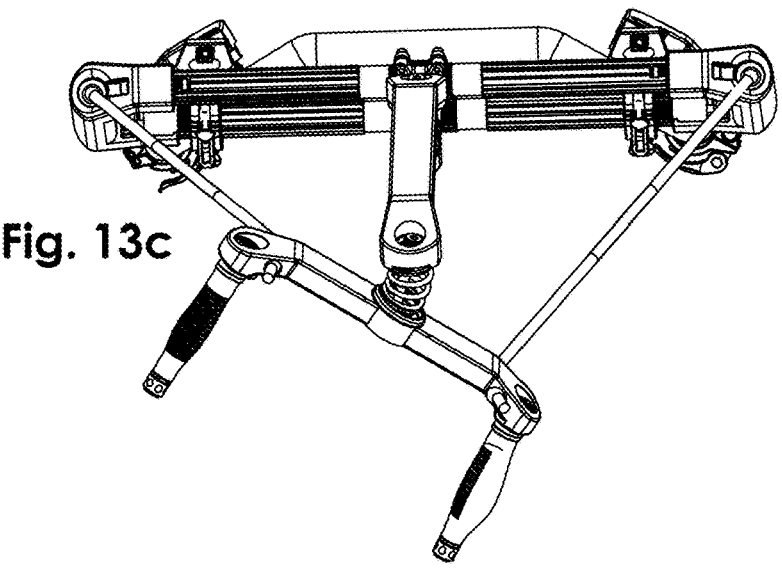
Figure 14A:
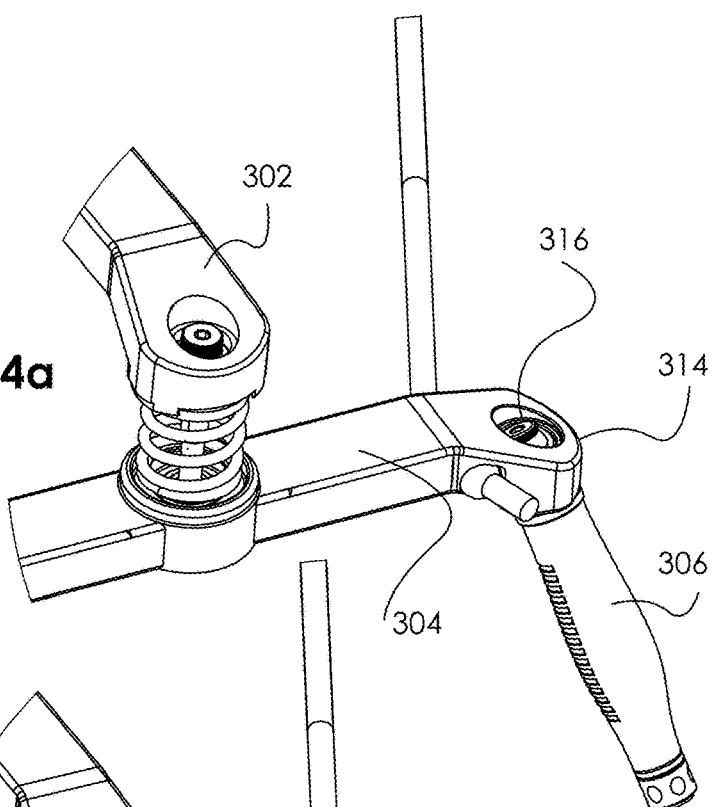
FIGS. 14a-14c illustrate schematic views of the hand grips of the grip bridge rotating in 360 degrees.
Figure 14B:
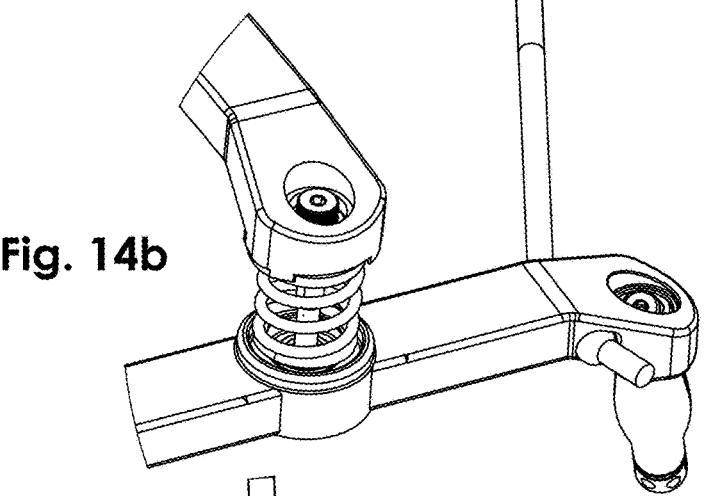
Figure 14C:
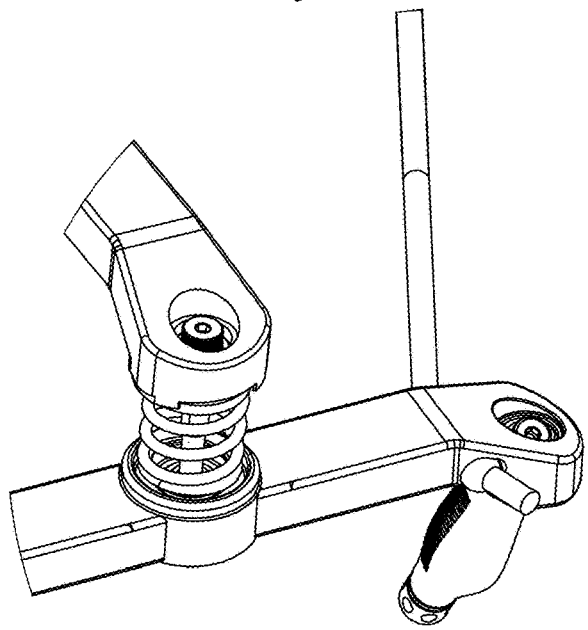

Additional views of the attachment for a push apparatus are provided. FIG. 2 is a schematic view of a frame connector. FIG. 3 is a schematic view of the height-adjustment frame. FIG. 4 is a schematic view of the pivot assembly. FIG. 5 is a schematic view of a frame connector body of the attachment attached to the push apparatus frame and the first ratchet bar section of the height-adjustment frame. FIG. 6 is a schematic view of the pivot assembly of the attachment attached to the second ratchet bar section. FIG. 7 is a bottom perspective view of the attachment device for a push apparatus. FIG. 8 is a schematic view of the first and second connection joints attached to the push apparatus frame and the ratchet tooth clamp of the frame connector attached to the first ratchet bar section. FIGS. 9a-9c illustrate top perspective views of the various height adjustment configurations for the pivot assembly. FIGS. 10a-10c illustrate side views of the various height adjustment configurations for the pivot assembly. FIGS. 11a-11c illustrate side perspective views of the pivot assembly swinging from one side to another side. FIGS. 12a-12c illustrate top views of the pivot assembly swinging from one side to another side. FIGS. 13a-13c illustrate front views of the grip bridge of the pivot assembly with the outer ends shifting up and down. FIGS. 14a-14c illustrate schematic views of the hand grips of the grip bridge rotating in 360 degrees. FIGS. 15a-15f illustrate the natural running movement permitted by the attachment for a push apparatus.

The various components of the attachment for a push apparatus can generally be comprised of rigid materials such that the attachment and its components cannot be folded, bent, or otherwise forced out of shape. Examples of materials that can be used include, but are not limited to, metal (for example, aluminum, steel, stainless steel, iron, brass, copper, etc.), plastic (for example, high-density polyethylene, polyvinyl chloride, polypropylene, other thermoplastic polymers, etc.), carbon fiber, ABS molding, glass-filled nylon, or other polymers, high durometer rubber, and combinations thereof.

As illustrated in FIG. 1, the push apparatus attachment device can include frame connecter 100 for connecting to a push apparatus frame 500, height-adjustment frame 200 connected to the frame connector 100, and pivot assembly 300 structured and configured to be gripped by a user's hands. In some embodiments, the pivot assembly 300 can further include swing bar 302, which can connect to the height-adjustment frame 200, and grip bridge 304, which can have at least two hand grips 306 and can connect to the swing bar 302.

In some embodiments, as illustrated in FIG. 2, frame connector 100 can be comprised of frame connector body 102 and one or more connection points. More specifically, frame connector body 102 may be approximately "L" shaped, having a first, straight portion and a second, straight portion that is perpendicular to the first, straight portion and connected on one end to one end of the first, straight portion. Additionally, the connection point(s) may connect frame connector body 102 to a push apparatus frame 500 at a connection point on each straight portion, thereby resulting in at least two connection points for connecting frame connector 100 to the push apparatus frame 500 at two locations.

For example, as illustrated in FIGS. 1 and 5, a first connection point may be first connection joint 104 that attaches at a position along the first, straight portion near a distal end of frame connector 100 (i.e., an end further from the user), and a second connection point may be second connection joint 106 that attaches at a position along the second, straight portion near a proximal end of the frame connector (i.e., an end closer to the user). In some cases, the position where the connection joints attach to frame connector body 102 may be at or near the opposite end of the straight portion compared to where the straight portions connect to each other. This enables frame connector body 102 to attach to a handle portion of the push apparatus as well as an arm portion, as illustrated in FIGS. 1 and 5. Each straight portion of frame connector body 102 may be a separate piece, as illustrated in FIG. 1. Alternatively, the various components of frame connector 100 may be one continuous piece.

As further illustrated in FIG. 1, some embodiments of the push apparatus attachment device can include two frame connectors 100. In some cases, the frame connector body can have either a right or a left-handedness due to the lengths of the first, straight portion and the second, straight portion not being equal (for example, the length of the first, straight portion can be shorter than the length of the second, straight portion), as illustrated in FIGS. 1, 2, 9a-9c, and 12a-12c. However, in some cases, the lengths of the two straight portions may be equal and, therefore, the frame connector body may have interchangeable handedness (i.e., the frame connector body can be used on the right or left arm of the push apparatus). As described above, if two frame connectors 100 are used, both can include two connection points for connection to the push apparatus frame 500 at two locations, and the two connection points of the second frame connector 100 can include first connection joint 104 near a distal end of the second frame connector and second connection joint 106 near a proximal end of the second frame connector.

The first and second connection joints 104, 106 may include any type of mechanical fastener such as, but not limited to, cam locks, as illustrated in FIG. 2. More specifically, the cam lock can include a lever and a threaded rod. To secure first and second connection joints 104, 106, the lever can be twisted (for example, counterclockwise), thereby turning the threaded rod and twisting it into a bar of push apparatus frame 500 and frame connector body 102 such that it secures the cam lock onto the bar and the frame connector body. The lever can then be pivoted so that it further locks the cam lock in place and pulls the bar of push apparatus frame 500 and frame connector body 102 closely together. However, other connection joints are possible such as, but not limited to, threaded knobs. For example, the threaded knob may include a threaded shaft with a nut and the threaded knob may be engaged with first and second connection joints 104, 106 as well as a bar of the push apparatus frame 500. More specifically, the threaded shaft can be inserted into first connection joint 104 (or second connection joint 106) and through a front side of the bar of the push apparatus frame 500, and the nut may be attached on a back side of the bar. Therefore, when the threaded shaft is rotated in a tightening direction, the nut secures further onto the threaded shaft, and the bar and frame connector body 102 are pulled together. Further, first and second connection joints 104, 106 may each also include swivel bearing 124 embedded within frame connector body 102. Swivel bearing 124 can allow for rotation between frame connector body 102 and push apparatus frame 500, thus enabling the attachment for a push apparatus to be implemented on a wider array of push apparatuses.

In some embodiments, frame connector 100 can have a third connection point that connects on height-adjustment frame 200, as illustrated in FIGS. 1, 5, 7, 8, 9*a*-9*c*, 11*a*-11*c*, and 12*a*-12*c*. More specifically, frame connector 100 may be rotatably connected to height-adjustment frame 200 such that the height of pivot assembly 300 is adjustable to accommodate users of different heights by offering height-based intervals on the height-adjustment frame, as illustrated in FIGS. 9*a*-9*c* and 10*a*-10*c*. In some cases, this connection point may include ratchet tooth clamp 108, as illustrated in FIG. 2. In other cases, this connection point may include a tube on height-adjustment frame 200, the tube having holes that can engage with pins in frame connector 100. In some embodiments, height-adjustment frame 200 may be approximately six inches deep and may permit 180 degrees of rotation, thereby offering twelve total inches of height change. As with first and second connection joints 104, 106, the third connection point may also include swivel bearing 124.

As illustrated in FIGS. 1-2 and 5, ratchet tooth clamp 108 may be located at one end of the second, straight portion of frame connector body 102 leaving second connection joint 106 to be located in a more distal position compared to the end of the second, straight portion. Therefore, some embodiments of the push apparatus attachment device can include two frame connectors 100 with each having three connection points: two on the push apparatus frame 500 to provide maximum stability to the push apparatus attachment device and one on height-adjustment frame 200 to connect it to the push apparatus attachment device, as illustrated in FIG. 5.

In some embodiments, the second, straight portion is one continuous piece. Other embodiments of the second, straight portion, however, may incorporate a rotational component between two separate pieces. For example, the second, straight portion of frame connector body 102 may include break 120, as illustrated in FIGS. 1-2, and 5, which separates frame connector 100 into two portions: a first portion that connects to push apparatus frame 500 and a second portion that connects to height-adjustment frame 200, wherein break 120 is located between these two connections. Break 120 allows for the proximal end of frame connector body 102 to be pivoted around an axis that runs distal-to-proximal in direction. This freedom permits for a wide array of positioning of the overall assembly of frame connectors 100 to a wide range of configurations of push apparatus frames 500. More specifically, break 120 enables 360-rotation, which allows for a more universal fit of frame connector 100 among push apparatuses. In some embodiments, the first portion of frame connector 100 connects to the second portion of the frame connector at break 120 via a set screw and lock nut assembly 122, as illustrated in FIG. 2.

As described above, another component of the push apparatus attachment device can be height-adjustment frame 200. In some embodiments, height-adjustment frame 200 can be comprised of height-adjustment frame body 202, first ratchet bar section 204, and second ratchet bar section 206. More specifically, height-adjustment frame may be roughly rectangular in shape, as illustrated in FIGS. 1, 3, and 7, having longer portions aligned in a roughly parallel configuration with a handlebar of the push apparatus. Therefore, the longer portions of height-adjustment frame body 202 can be located at distal and proximal positions relative to the user and the shorter portions of the height-adjustment frame body can be equidistant to the user with both short sides having a distal and proximal end. However, while height adjustment frame may be roughly rectangular in shape, it can also incorporate variations in its shape that detract from a rectangle, such as the angled corners illustrated in FIG. 3.

Height-adjustment frame body 202 may be comprised of multiple pieces. For example, the two longer portions and the two shorter portions may be separate components that are assembled to create one piece. They may be assembled utilizing set screws that are medially to laterally positioned and secured with square nuts mortised with the medial and lateral ends of the two longer portions. In some cases, height-adjustment frame body 202 may be comprised of one piece, wherein each of the four portions (two short and two long) are merely portions of one overall component. Regardless of whether height-adjustment frame body 202 is comprised of one or many pieces, the functionality can remain the same.

In some embodiments, height-adjustment frame body 202 is comprised of tubing, such that a horizontal cross-section of one part of the height-adjustment frame body would be circular in appearance. However, height-adjustment frame body 202 may alternatively be flat or more "edged" in appearance in that a horizontal cross-section would be square, rectangular, triangular, or any other shape in appearance. In some cases, height-adjustment frame body 202 may have a combination of these features. For example, central sections of the long portions may be tubular while outer sections of the long portions may be rectangular, as illustrated in FIGS. 1 and 3. As described in more detail below, both long portions of height-adjustment frame body 202 can include a ratchet bar section and, in some cases, both ratchet bar sections can be centered along the long portions of the height-adjustment frame body such that the push apparatus attachment device can be aligned with a central axis of the push apparatus. Further, each ratchet bar section may be continuous or intermittent, wherein the ratchet bar section is interspersed with smooth portions, as illustrated in FIGS. 1 and 3. In some embodiments, the long portions of height-adjustment frame body 202 are mirror images of each other and are interchangeable, such that the height-adjustment frame body can be flipped 180 degrees and still be securable by frame connectors 100 and pivot assembly 300.

The shorter portions of height-adjustment frame body 202 may, in some embodiments, include hollow tubing through which tension bands 400 can be inserted and/or anchored. More specifically, tension bands 400 can be mounted between height adjustment frame 200 and bridge assembly 300. In some cases, tension band 400 may be one continuous piece that travels through the tubing of height-adjustment frame body 202 and secures on each end to bridge assembly 300. In other cases, as illustrated in FIG. 1, the attachment for push apparatus may include two tension bands: (1)

lateral tension band 402 attached on its proximal end to grip bridge 304 and on its distal end to anchor point 208, wherein anchor point 208 is located on or in a first shorter portion of height-adjustment frame body 202 and (2) medial tension band 404 attached on its proximal end to the grip bridge and on its distal end to anchor point 210, wherein anchor point 210 is located on or in a second shorter portion of height-adjustment frame body 202. The attachment of tension band 400 to height-adjustment frame body 202 may take place within, through, and/or on anchor points 208, 210. The attachment of tension band 400 to grip bridge 304 may take place within, through, and/or on outer ends 314 of the grip bridge.

Tension bands 400 can be made of an elastomeric material and can, therefore, be adjustable by increasing or reducing tension. For example, lengthening tension band 400 can increase tension while shortening the tension band can reduce tension. The functional increase or decrease in tensioning provides for and assists the control of the push apparatus for directional movement medially and/or laterally, as the push apparatus is being moved distally by the user.

First ratchet bar section 204 may be located on the distal, long portion of height-adjustment frame body 202 and may wrap around or replace a portion of the height-adjustment frame body, as illustrated in FIGS. 1 and 3. As illustrated in FIGS. 1 and 5, ratchet tooth clamp 108 on a proximal end of frame connector body 102 can connect to first ratchet bar section 204. First ratchet bar section 204 may be the entire horizontal length of the distal, long portion of height-adjustment frame body 202. Alternatively, first ratchet bar section 204 may only be a portion of the length of the distal portion of height-adjustment frame body 202 such that the distal portion is part tubing (or other shape) and part ratchet bar section. For example, as illustrated in FIGS. 1 and 3, first ratchet bar section 204 may be comprised of three or more sections (at least one inner section and two outer sections) with the tubing exposed between each section.

In some cases, the minimum length of first ratchet bar section 204 may be determined by the distance between proximal endpoints of frame connector bodies 102 when two frame connectors 100 are connected to the push apparatus frame 500. For example, if the distance between proximal endpoints of two frame connector bodies (i.e., where ratchet tooth clamp 108 connects to frame connector body 102) is X, the length of first ratchet bar section 204 may have a minimum length of at least X. However, the length of first ratchet bar section 204 may be longer than the distance between proximal endpoints of frame connector bodies 102. This can help accommodate variation in widths of push apparatus frames 500 such that the push apparatus attachment device can be universally used on any push apparatus. Further, in cases where first ratchet bar section 204 is comprised of several sections, the length of each section may be less than the minimum length as defined above due to the spacing between each section, as illustrated in FIGS. 1 and 3.

Second ratchet bar section 206 may be located on the proximal, long portion of height-adjustment frame body 202, and similarly to first ratchet bar section 204, may wrap around or replace a portion of the height-adjustment frame body, as illustrated in FIG. 3. In some embodiments, compared to first ratchet bar section 204, second ratchet bar section 206 can be limited to a shorter length of the proximal, long portion of height-adjustment frame body 202 such that the proximal portion is part tubing (or other shape) and part ratchet bar section. However, in embodiments wherein the distal and proximal portions of height-adjustment frame body 202 are mirror images of each other, second ratchet bar section 206 may also mirror first ratchet bar section 204, as illustrated in FIGS. 1 and 3. More specifically, second ratchet bar section 206 may be comprised of three or more sections (at least one inner section and two outer sections) with the tubing exposed between each section. As illustrated in FIGS. 1 and 6, ratchet tooth clamp 308 on a distal end of pivot assembly 300 can connect to second ratchet bar section 206.

In some cases, the minimum length of second ratchet bar section 206 may be determined by the width of ratchet tooth clamp 308. For example, if ratchet tooth clamp 308 has width Y, the length of second ratchet bar section 206 may have a minimum length of at least Y so that the ratchet tooth clamp can properly pair with the second ratchet bar section. However, the length of second ratchet bar section 206 may be longer than the width of ratchet tooth clamp 308. This is also the case for the inner section of first ratchet bar section 204 in embodiments where the first ratchet bar section is comprised of three or more sections. Further, in cases where second ratchet bar section 206 is comprised of several sections, the inner section may have a minimum length of at least Y and the length of each outer section may be bigger or smaller than length Y as long as they accommodate connections to frame connector bodies 102.

As described above and illustrated in FIG. 4, another component of the push apparatus attachment device can be pivot assembly 300. In some embodiments, and as illustrated in FIG. 1, pivot assembly 300 can be comprised of swing bar 302, which can connect to height-adjustment frame 200 via ratchet tooth clamp 308, as described above, grip bridge 304 which can connect to the swing bar, and at least two hand grips 306, which can connect to the grip bridge. More specifically, swing bar 302 may be an elongate bar that extends from a distal end, where it attaches to height-adjustment frame 200, to a proximal end, where it attaches to grip bridge 304, as illustrated in FIGS. 1 and 7. Grip bridge 304 may also be an elongate bar but may extend laterally such that it is perpendicular to swing bar 302.

In some embodiments, swing bar 302 of pivot assembly 300 can be rotatably connected to height-adjustment frame 200 such that when the height adjustment frame body is rotated upward or downward relative to frame connector 100 to accommodate users of different heights, the swing bar can be rotated an opposite direction so that it remains parallel to the ground, as illustrated in FIGS. 9a-9c and 10a-10c. In some cases, this rotatable connection point may include ratchet tooth clamp 308. As ratchet tooth clamp 108 can attach to first ratchet bar section 204, ratchet tooth clamp 308 can attach to second ratchet bar section 206 in a central location on (or inner section of) the second ratchet bar section.

As illustrated in FIG. 4, swing bar 302 can include ratchet tooth clamp 308 and pivot connect 310. In some embodiments, ratchet tooth clamp 308 can be a connection component on a distal end of a straight arm. Ratchet tooth clamp 308 may connect to a central location of the proximal, long portion of height-adjustment frame body 202 using ratchet teeth, and a proximal end of the arm of the ratchet tooth clamp may connect to pivot connect 310, which also connects to swing bar 302. In other words, the distal end of swing bar 302 can connect to height-adjustment frame 200 via pivot connect 310, as illustrated in FIG. 6, and this connection may further include a connection with ratchet tooth clamp 308. In some cases, pivot connect 310 can enable free movement of a proximal end of swing bar 302 along a horizontal arced path relative to a user during use, wherein the horizontal arced path is in a single plane arching between left and right endpoints, as illustrated in FIGS. 11a-11c and 12a-12c.

Pivot connect 310, connecting the distal end of swing bar 302 and the proximal end of the arm of ratchet tooth clamp 308, can, in some embodiments, further include tension spring 318, as illustrated in FIG. 6. Tension spring 318 can surround pivot connect 310, which can include a pivot pin. The purpose of tension spring 318 is to provide independent and/or additional adjustable tension to the tension provided by tension bands 400. Additionally, tension spring 318 can provide for a centering mechanism for swing bar 302 when the push apparatus is at rest and not in use. The tension provided by tensions spring 318 can be provided horizontally in a medial to lateral and lateral to medial arc of swing bar 302. In some embodiments, pivot connect 310 can further include tensioning adjustment set screw 322 that allows for adjustable variation to the tension provided by tension spring 318. Set screw 322 can be secured with tightening knob 324, which allows for fine adjustment and customization compared to the larger-scale adjustments of, for example, height-adjustment frame 200.

In addition to ratchet tooth clamp 308 and pivot connect 310 on a distal end of swing bar 302, pivot assembly 300 can include pivot connect 312, as illustrated in FIG. 4. More specifically, the proximal end of swing bar 302 can connect to grip bridge 304 using pivot connect 312, which connects at or near a central portion of the grip bridge. In some cases, pivot connect 312 can enable free movement of outer ends 314 of grip bridge 304 in three dimensions relative to a user during use, as illustrated in FIGS. 13a-13c. Pivot connect 312 may have any connection type such that it allows for grip bridge 304 to not only freely move in three dimensions as described above, but can also allow for user arm and hand movement up and down to account for natural running forms by allowing outer ends 314 of the grip bridge to move up and down, as illustrated in FIGS. 13a-13c. Therefore, pivot connect 312 can allow for grip bridge 304 to pivot up and down on its central axis between 90 and 180 degrees.

As with pivot connect 310, pivot connect 312 can include tension spring 320, as illustrated in FIGS. 4 and 7. Tension spring 320 can provide a 360-degree tension in universal X, Y and Z directions of grip bridge 304. Tension spring 320 can also provide tension for the range of motion of grip bridge 304 distally, proximally, medially, laterally, superiorly, and inferiorly with pivot connect 312 centered at the proximal end of swing bar 302. Similar to tension spring 318, tension spring 320 can provide for a three-dimensional (distal to proximal, superior to inferior, and medial to lateral) centering of grip bridge 304 when at rest. In some embodiments, pivot connect 312 can contain tensioning adjustment set screw 326 that allows for adjustable variation to the tension provided by tension spring 320. Set screw 326 can be secured with a tightening knob, which allows for fine adjustment and customization.

As mentioned above and illustrated in FIGS. 1 and 4, grip bridge 304 can include hand grip apertures 316 on each outer end 314 of the grip bridge. Therefore, grip bridge 304 may be an elongate bar positioned perpendicular to swing bar 302 that connects at pivot connect 312 to the swing bar and has hand grip apertures 316 located at outer ends 314. In some embodiments, grip bridge 304 may further include hand grips 306, wherein an individual hand grip may be positioned in one of the hand grip apertures 316 and can be configured to freely rotate 360 degrees within the hand grip aperture 316, as illustrated in FIGS. 14a-14c. More specifically, one end of each hand grip 306 may connect to hand grip apertures via, for example, a ball joint such that the hand grip is not limited in its rotational or pivoting motion. Further, in some cases, hand grip 306 may twist or pivot within hand grip aperture 316 (for example, the hand grip can pivot 45 degrees) to allow for rotation of a user's first while running.

In this manner, frame connector 100 enables the push apparatus attachment device to attach to a push apparatus, as illustrated in FIGS. 1 and 7, height-adjustment frame 200 enables a user to adjust the apparatus to an appropriate angle based on the height of the user, as illustrated in FIGS. 9a-9c and 10a-10c, and pivot assembly 300 enables free movement along all planes to accommodate a user's natural running form, as illustrated in FIGS. 11a-11c, 12a-12c, 13a-13c, 14a-14c, and 15a-15f.

More specifically, FIGS. 15a-15f illustrate a natural running form while using the disclosed device. FIGS. 15a-15c illustrate running form with a right leg forward and FIGS. 15d-15f illustrate running form with a left leg forward. FIG. 15a illustrates, from a side view, right leg forward, left leg rearward, right arm low and rearward, and left arm high and forward. FIG. 15b illustrates, from a top view, right leg forward, left leg rearward, right arm low and rearward, and left arm high and forward. FIG. 15c illustrates, from a front view, right leg forward, left leg rearward, right arm low and rearward, and left arm high and forward. FIG. 15d illustrates, from a side view, left leg forward, right leg rearward, left arm low and rearward, and right arm high and forward. FIG. 15e illustrates, from a top view, left leg forward, right leg rearward, left arm low and rearward, and right arm high and forward. FIG. 15f illustrates, from a front view, left leg forward, right leg rearward, left arm low and rearward, and right arm high and forward.

In one example of a use case, a user can attach at least two frame connecters 100 to a push apparatus frame 500, each frame connector 100 connecting at two points along the push apparatus frame 500, as described above. If needed, the user can rotate height-adjustment frame 200, which can be pivotally connected to the frame connectors 100, up or down to accommodate a user's height. Next, a user can rotate swing bar 302 of pivot assembly 300 that is pivotally connected to the height-adjustment frame 200 the opposite direction (for example, down or up) to keep the pivot assembly 300 parallel to the ground. The user can then grip each of two hand grips 306 with the user's hands, wherein the hand grips 306 can be located on each of the two outer ends of grip bridge 304 of pivot assembly 300, and the grip bridge can be pivotally connected to swing bar 302. Finally, the user can push the push apparatus frame 500 forward to propel the push apparatus in a forward direction.

In some cases, as described above, a proximal end of swing bar 302 can move along a horizontal arced path relative to a user during use, the swing bar's horizontal arced path being in a single plane arching between left and right endpoints. Further, each of the two outer ends of grip bridge 304 can move in three dimensions relative to a user during use, and the grip bridge connection to swing bar 302 may also allow for user arm and hand movement up and down to account for natural running forms by allowing outer ends 314 of the grip bridge to move up and down. Lastly, each of the two hand grips 306 can be positioned in hand grip apertures 316 at the outer ends 314 of the grip bridge 304, and each of the two hand grips 306 can be configured to freely rotate 360 degrees within the hand grip aperture 316. FIGS. 15a-15f illustrate how the attachment device for a push apparatus of the present disclosure accommodates all of these movements. It further illustrates how the attachment device moves with a runner and enables the runner to maintain their current running form as the attachment device does not constrain runner arm-movement in any direction.

Persons of ordinary skill in arts relevant to this disclosure and subject matter hereof will recognize that embodiments may comprise fewer features than illustrated in any individual embodiment described by example or otherwise contemplated herein. Embodiments described herein are not meant to be an exhaustive presentation of ways in which various features may be combined and/or arranged. Accordingly, the embodiments are not mutually exclusive combinations of features; rather, embodiments can comprise a combination of different individual features selected from different individual embodiments, as understood by persons of ordinary skill in the relevant arts. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

What is claimed is:

1. A push apparatus attachment device comprising:
   a frame connecter for connecting to a push apparatus frame;
   a height-adjustment frame connected to the frame connector; and
   a pivot assembly structured and configured to be gripped by a user's hands, the pivot assembly including:
      a swing bar connected to the height-adjustment frame, and
      a grip bridge having at least two hand grips, the grip bridge being connected to the swing bar.

2. The push apparatus attachment device of claim 1, wherein a distal end of the swing bar connects to the height-adjustment frame via a pivot connect.

3. The push apparatus attachment device of claim 2, wherein the pivot connect enables free movement of a proximal end of the swing bar along a horizontal arced path relative to a user during use, wherein the horizontal arced path is in a single plane arching between left and right endpoints.

4. The push apparatus attachment device of claim 1, wherein a central portion of the grip bridge connects to the swing bar using a pivot connect.

5. The push apparatus attachment device of claim 4, wherein the pivot connect enables free movement of outer ends of the grip bridge in three dimensions relative to a user during use.

6. The push apparatus attachment device of claim 1, wherein the grip bridge includes a hand grip aperture on opposite ends of the grip bridge.

7. The push apparatus attachment device of claim 6, wherein each hand grip is positioned in one of the hand grip apertures and is configured to freely rotate 360 degrees within the hand grip aperture.

8. The push apparatus attachment device of claim 1, wherein
   the frame connector includes a frame connector body and at least two connection points for connection to the push apparatus frame at a plurality of locations; and
   the at least two connection points include
      a first connection joint near a distal end of the frame connector, and
      a second connection joint near a proximal end of the frame connector.

9. The push apparatus attachment device of claim 8, further comprising a second frame connector having at least two connection points for connection to the push apparatus frame at a plurality of locations, wherein the at least two connection points of the second frame connector include
   a first connection joint near a distal end of the second frame connector, and
   a second connection joint near a proximal end of the second frame connector.

10. The push apparatus attachment device of claim 8, further comprising
    a third connection point on the proximal end of the frame connector; and
    a break in the frame connector between the second connection joint and the third connection point.

11. The push apparatus attachment device of claim 1, wherein the height-adjustment frame is rotatably connected to the frame connector such that the height of the pivot assembly is adjustable to accommodate users of different heights.

12. The push apparatus attachment device of claim 11, wherein the pivot assembly is rotatably connected to the height-adjustment frame such that at least the swing bar remains parallel to the ground when the height-adjustment frame rotates relative to the frame connector.

13. The push apparatus attachment device of claim 11, further comprising
    a first tension band attaching on one end to the height-adjustment frame and on an opposite end to a first outer end of the grip bridge; and
    a second tension band attaching on one end to the height-adjustment frame and on an opposite end to a second outer end of the grip bridge that is opposite the first outer end.

14. The push apparatus attachment device of claim 1, wherein the height-adjustment frame includes a height-adjustment frame body, a first ratchet bar section on a distal portion of the height-adjustment frame body, and a second ratchet bar section on a proximal portion of the height-adjustment frame body.

15. The push apparatus attachment device of claim 14, wherein
    the frame connector includes a ratchet tooth clamp on a proximal end of the frame connector body for connection to the first ratchet bar section; and
    the pivot assembly includes a ratchet tooth clamp on a distal end of the pivot assembly for connection to the second ratchet bar section.

16. A push apparatus attachment device comprising:
at least two frame connecters for connecting to a push apparatus frame, each frame connector connecting at two points along the push apparatus frame;
a height-adjustment frame pivotally connected to the at least two frame connectors; and
a pivot assembly structured and configured to be gripped by a user's hands, the pivot assembly including:
   a swing bar pivotally connected to the height-adjustment frame, and
   a grip bridge having at least two hand grips, one on opposite ends of the grip bridge, the grip bridge being connected to the swing bar,
wherein
   the pivot connection between the height-adjustment frame and the frame connectors enables the pivot assembly to adjust in height to accommodate users of different heights, and
   the pivot connection between the swing bar and the height-adjustment frame enables the pivot assembly to remain parallel to the ground when the height-adjustment frame rotates relative to the frame connectors.

17. The push apparatus attachment device of claim 16, wherein
   a distal end of the swing bar connects to the height-adjustment frame using a pivot connect, and
   the pivot connect enables free movement of a proximal end of the swing bar along a horizontal arced path relative to a user during use, wherein the horizontal arced path is in a single plane arching between left and right endpoints.

18. The push apparatus attachment device of claim 16, wherein
   a central portion of the grip bridge connects to the swing bar using a pivot connect, and
   the pivot connect enables free movement of outer ends of the grip bridge in three dimensions relative to a user during use.

19. The push apparatus attachment device of claim 16, wherein
   the grip bridge includes a hand grip aperture on opposite ends of the grip bridge, and
   each hand grip is positioned in one of the hand grip apertures and is configured to freely rotate 360 degrees within the hand grip aperture.

20. A method of using a push apparatus attachment device, the method comprising:
   attaching at least two frame connecters to a push apparatus frame, each frame connector connecting at at least two points along the push apparatus frame;
   rotating a height-adjustment frame that is pivotally connected to the frame connectors to accommodate a user's height;
   rotating a swing bar of a pivot assembly that is pivotally connected to the height-adjustment frame to keep the pivot assembly parallel to the ground;
   gripping each of two hand grips with the user's hand, wherein the hand grips are located on each of two outer ends of a grip bridge of the pivot assembly, the grip bridge being pivotally connected to the swing bar; and
   pushing the push apparatus frame forward, wherein
      a proximal end of the swing bar moves along a horizontal arced path relative to a user during use, the swing bar horizontal arced path being in a single plane arching between left and right endpoints,
      each of the two outer ends of the grip bridge move in three dimensions relative to a user during use,
      each of the two hand grips are positioned in hand grip apertures at the outer ends of the grip bridge, and
      each of the two hand grips are configured to freely rotate 360 degrees within the hand grip aperture.

* * * * *